Sept. 12, 1939. V. J. FRANCIS ET AL 2,172,839
HIGH PRESSURE METAL-VAPOR ELECTRIC DISCHARGE DEVICE
Filed Sept. 13, 1937
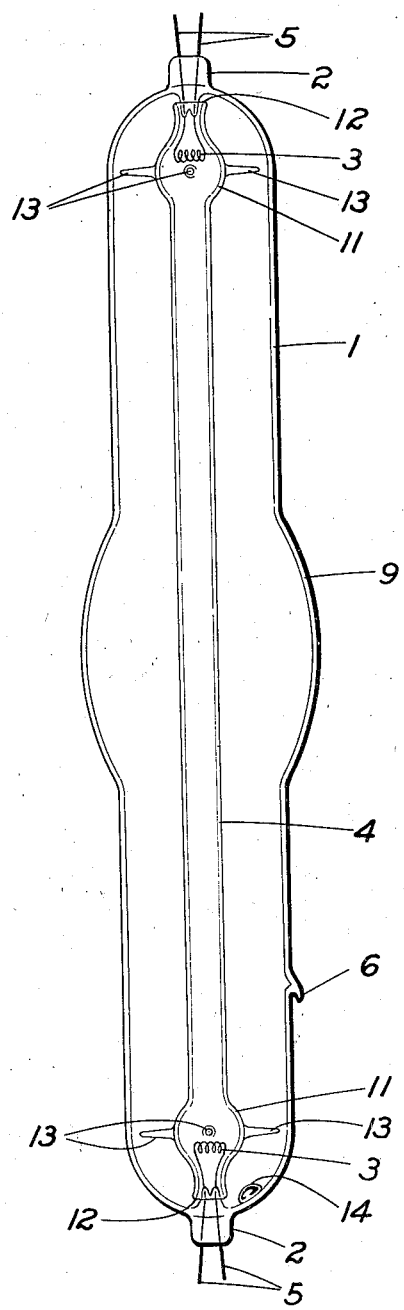
INVENTORS
Victor James Francis
John Walter Ryde
BY Harry E. Dunham
ATTORNEY Patented Sept. 12, 1939

2,172,839

UNITED STATES PATENT OFFICE 2,172,839

HIGH-PRESSURE METAL-VAPOR ELECTRIC DISCHARGE DEVICE

Victor J. Francis and John W. Ryde, Middlesex, England, assignors to General Electric Company, a corporation of New York Application September 13, 1937, Serial No. 163,686
In Great Britain September 22, 1936

4 Claims. (Cl. 176—122)

This invention relates to an improvement in or modification of high-pressure metal-vapor electric discharge devices as described and claimed in British Patent No. 461,211.

The essential feature of such devices is the presence of a resistant vitreous sheath between the discharge path and a sealed envelope having a non-resistant part, which sheath fulfills certain further conditions.

The object of the present invention is to provide an electric discharge lamp device of the type described in the British patent referred to above and which is capable of operation with an arc temperature higher than has been possible heretofore. Still further objects and advantages attaching to the device and to its use and operation will be apparent to those skilled in the art from the following particular description.

It is stated in the specification of the British patent referred to above that of the vitreous materials at present known, quartz is more resistant than any other. This statement is no longer true; materials not containing silica as a main constituent, are now known to us suitable for use in discharge devices, which are vitreous, and yet have softening temperatures notably higher than that of quartz. An example of such material is one consisting of 80% zirconium oxide ($ZrO_2$), 14% thorium oxide ($ThO_2$), 6% calcium oxide (CaO). The softening point of this material is above 2000° C.; if the very highest softening point is not required a few per cent of silica ($SiO_2$) may be added and the softening point somewhat reduced thereby.

Further it has been found that the material of the sheath need not be vitreous. The object of prescribing a vitreous material was, of course, to secure the necessary transparency. But true transparency is not required; translucency is sufficient if the true absorption coefficient is sufficiently low. Ceramic materials, if they are sufficiently thin, are sometimes sufficiently translucent. Thus a material composed of 90% zirconium oxide ($ZrO_2$) and 10% magnesium oxide (MgO) is satisfactory, if it is in the form of a tube only a fraction of a millimetre thick. Such a material has a softening temperature of about 2000° C.

Again, material intermediate between vitreous and ceramic may be used: for example an opaline glass. The first mentioned material is apt to be more or less opaline, especially when silica is present. Again, a ceramic material glazed on the surface by heating in an oxy-hydrogen flame or like manner can be used.

According to the present invention, in a high-pressure metal-vapor electric discharge device comprising a resistant sheath permeable to light intervening between the discharge path and a sealed envelope having a non-resistant part, which sheath in operation surrounds the discharge column so closely as to prevent its wandering, but does not form a hermetically sealed envelope completely enclosing the discharge, the said resistant sheath is made of a material which has a softening temperature higher than that of quartz, and is either translucent or transparent.

It is to be observed that, in a device according to the present invention, the sealed envelope may be of quartz. In the British patent one of the objects of the invention was said to be the avoidance of leads sealed through quartz. But the art of sealing leads through quartz has advanced so greatly in the interval that it is not nearly as important as it was, to avoid such seals. On the other hand the importance of attaining the highest possible temperatures in the discharge is as great as ever; and the presence of the sheath is again required by the difficulty of sealing leads through the most resistant materials; for at present it has not been found easy to seal leads through the non-siliceous materials above mentioned.

It is to be noted that the term extra high-pressure has been abandoned in this specification, although it is used in the specification of the British Patent 461,211. The reason is not that the pressures contemplated are lower than those contemplated in the specification of the British Patent 461,211; it is that, with the development of the art, the distinction between high-pressure and extra high-pressure is becoming obscured; the pressures used occupy almost continuously the whole range from about 1 atmosphere to more than 100 atmospheres. On the other hand the restriction to a cross section of 38 sq. mms. imposed on the sheath is removed; for at the higher temperatures permissible when sheaths more resistant than quartz are used, it is no longer appropriate.

In the drawing accompanying and forming part of this specification an embodiment of the invention is shown in a front elevational view.

Referring to the drawing the gaseous electric discharge lamp device comprises a tubular envelope 1 of vitreous material, such as quartz. Said container 1 has a bulge 9 at the mid-part thereof. Through a pinch 2 at either end are sealed two current leads 5 supporting the thermionic activated electrode 3 which consists of a tungsten coil coated with or enclosing a material having high electron emissivity at elevated temperatures, such as barium oxide. When desired, said current leads consist of tungsten or molybdenum and are joined to said envelope 1 by a graded seal. Other types of seal structures, such as ribbon seals, now known in the art are used, when desired. The discharge path between the electrodes 3 is surrounded by a sheath 4 consisting of one of the materials disclosed above. Said sheath 4 is cylindrical except where it is expanded into wider portions 11 about the electrodes 3. The ends 12 of the sheath 4 are about 3 mm. from the ends of the envelope 1. A plurality of spikes 13 project from the expanded parts of the sheath 4 and abut against the inner surface of the envelope 1 at the part thereof where the rounded ends of the envelope 1 join the tubular part thereof. Said envelope 1 is provided with an exhaust tip 6.

In the manufacture of this device, the expanded portion 9 is originally absent. One end of the envelope is formed and the electrode sealed through it. The sheath provided with the spikes is then inserted and located in its final position at this end. The other end of the envelope is then formed, and the electrode sealed through it; but this end is made at a somewhat greater distance from the adjacent end of the sheath than it will eventually occupy. The envelope is finally blown out in the middle to form the enlargement 9, so that it is contracted in length, and the end assumes the correct position with regard to the sheath. By this means the difficulty of forming an end very close to the end of the sheath is avoided. After evacuation of the container 1 a starting gas, such as argon, at a pressure of about 1 to 10 mm. and a quantity 14 of vaporizable metal, such as mercury, is introduced into the container 1 through the exhaust tube. Preferably the quantity 14 of mercury is such that it is completely vaporized at a container temperature slightly below the temperature of the container 1 when the lamp is at equilibrium. When this operation is complete the exhaust tube is sealed off to form the tip 6.

The lamp device described above is capable of operation at higher arc temperatures than has been possible heretofore and is a highly efficient light source.

While we have shown and described and have pointed out in the annexed claims certain novel features of the invention, it will be understood that various omissions, substitutions and changes in the forms and details of the device illustrated and in its use and operation may be made by those skilled in the art without departing from the broad spirit and scope of the invention.

What we claim as new and desire to secure by Letters Patent of the United States, is:

1. A high pressure metal vapor electric discharge lamp device comprising a sealed envelope, thermionic electrodes mounted therein, a sheath permeable to light interposed between said envelope and the discharge path between said electrodes, said envelope being non-resistant to the discharge between said electrodes, said sheath being resistant to said discharge, being pervious to the gaseous filling in said envelope and surrounding said discharge so closely as to prevent a deviation of the discharge from a substantially straight path between said electrodes, said sheath consisting of a material containing not less than 80% zirconium oxide ($ZrO_2$).

2. A high pressure metal vapor electric discharge lamp device comprising a sealed envelope, thermionic electrodes mounted therein, a sheath permeable to light interposed between said envelope and the discharge path between said electrodes, said envelope being non-resistant to the discharge between said electrodes, said sheath being resistant to said discharge, being pervious to the gaseous filling in said envelope and surrounding said discharge so closely as to prevent a deviation of the discharge from a substantially straight path between said electrodes, said sheath consisting of 80% zirconium oxide ($ZrO_2$), 14% thorium oxide ($ThO_2$) and 6% calcium oxide ($CaO$).

3. A high pressure metal vapor electric discharge lamp device comprising a sealed envelope, thermionic electrodes mounted therein, a sheath permeable to light interposed between said envelope and the discharge path between said electrodes, said envelope being non-resistant to the discharge between said electrodes, said sheath being resistant to said discharge, being pervious to the gaseous filling in said envelope and surrounding said discharge so closely as to prevent a deviation of the discharge from a substantially straight path between said electrodes, said sheath consisting of 90% zirconium oxide ($ZrO_2$) and 10% magnesium oxide ($MgO$).

4. A high pressure metal vapor electric discharge lamp device comprising a sealed envelope, thermionic electrodes mounted therein, a sheath permeable to light interposed between said envelope and the discharge path between said electrodes, said envelope being non-resistant to the discharge between said electrodes, said sheath being resistant to said discharge and surrounding said discharge, said sheath consisting of a material containing not less than 80% zirconium oxide ($ZrO_2$).

VICTOR J. FRANCIS.
JOHN W. RYDE.